US010095583B2

(12) United States Patent
Chow

(10) Patent No.: US 10,095,583 B2
(45) Date of Patent: Oct. 9, 2018

(54) LAZY TRANSMISSION OF MEMORY PAGES DURING CHECKPOINTING

(71) Applicant: VMware, Inc., Palo Alto, CA (US)

(72) Inventor: James E. Chow, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 14/973,524

(22) Filed: Dec. 17, 2015

(65) Prior Publication Data
US 2017/0177441 A1    Jun. 22, 2017

(51) Int. Cl.
G06F 3/00         (2006.01)
G06F 11/00        (2006.01)
G06F 11/14        (2006.01)
G06F 3/06         (2006.01)
G06F 9/455        (2018.01)

(52) U.S. Cl.
CPC .......... G06F 11/1407 (2013.01); G06F 3/065 (2013.01); G06F 3/067 (2013.01); G06F 3/0619 (2013.01); G06F 9/45558 (2013.01); G06F 11/1435 (2013.01); G06F 11/1451 (2013.01); G06F 11/1464 (2013.01); G06F 2009/4557 (2013.01); G06F 2009/45562 (2013.01); G06F 2009/45575 (2013.01); G06F 2201/84 (2013.01)

(58) Field of Classification Search
CPC ............... G06F 9/45558; G06F 11/203; G06F 11/1435; G06F 11/1451
USPC ........................................................ 711/162
See application file for complete search history.

(56) References Cited

U.S. PATENT DOCUMENTS

| | | | |
|---|---|---|---|
| 8,661,213 B2 * | 2/2014 | Scales ................. | G06F 9/45558 707/639 |
| 2012/0084782 A1 * | 4/2012 | Chou .................. | G06F 11/1484 718/102 |
| 2013/0205113 A1 * | 8/2013 | Ahmad ................ | G06F 12/023 711/170 |
| 2014/0095821 A1 * | 4/2014 | Yang ................. | G06F 17/30091 711/162 |
| 2014/0215172 A1 * | 7/2014 | Tsirkin ................. | G06F 11/203 711/162 |

* cited by examiner

Primary Examiner — Mohamed Gebril
(74) Attorney, Agent, or Firm — Patterson & Sheridan LLP

(57) ABSTRACT

During checkpointing of a virtual computing instance running in a first host computer, memory pages that have been modified during a checkpoint time interval are lazily transmitted from the first host computer to a second, backup, host computer. The lazy transmission technique includes the steps of stunning the virtual computing instance at the end of the time interval, and after said stunning, (i) detecting at the first host computer the memory pages that have been modified during the time interval, and (ii) copying one or more of the modified memory pages to a memory region in the first host computer. Then, after the virtual computing instance resumes execution, i.e., while the virtual computing instance is running in the first host computer, the copied memory pages are transmitted from the memory region in the first host computer to the second host computer.

20 Claims, 6 Drawing Sheets

US 10,095,583 B2

LAZY TRANSMISSION OF MEMORY PAGES DURING CHECKPOINTING

BACKGROUND

The advantages of virtual machine (VM) technology have become widely recognized. Among these advantages is the ability to run multiple virtual machines on a single host platform. This makes better use of the capacity of the hardware, while still ensuring that each user enjoys the features of a "complete," isolated computer.

The advantages of various types of checkpointing are also widely recognized, such as providing a backup of some aspect of a computer system and providing the ability to revert back to a previously generated checkpoint to undo changes to some aspect of a computer system or to recover from a failure affecting the computer system. One particular use of checkpointing that is advantageous is to capture the state of a long-running computation, so that, if the computation fails at some point, it can be resumed from the checkpointed state, instead of having to restart the computation from the beginning.

Fast and frequent checkpointing of virtual machines is a useful technology for a number of applications: (1) continuous checkpointing allows users to revert back their application to almost any previous point in time; (2) reverse debugging based on deterministic replay also requires frequent checkpoints to reduce the amount of replay from a previous checkpoint that is required to execute backwards; (3) fast checkpoints can enable the possibility of speeding up an application by allowing speculative calculations that can be reverted if necessary; and (4) fast checkpoints provides a way of providing fault tolerance.

With respect to (4), fast and frequent checkpointing is especially attractive, since it can be used for symmetric multiprocessing (SMP) virtual machines. Deterministic replay is typically very hard to do efficiently for SMP VMs, so fault tolerance based on deterministic replay is typically only supported for single processor VMs.

SUMMARY

One or more embodiments provide techniques to lazily transmit from a first host computer to a second host computer, memory pages of a virtual computing instance (e.g., a virtual machine) running on the first host computer that have been modified during a checkpoint time interval. The lazy transmission technique includes the steps of stunning the virtual computing instance at the end of the time interval, and after stunning, (i) detecting at the first host computer the memory pages that have been modified during the time interval, and (ii) copying one or more of the modified memory pages to a memory region in the first host computer. Then, after the virtual computing instance resumes execution, i.e., while the virtual computing instance is running again in the first host computer, the copied memory pages are transmitted from the memory region in the first host computer to the second host computer.

Further embodiments include a non-transitory computer-readable storage medium storing instructions that, when executed by a computer system, cause the computer system to perform the method set forth above, and a computer system programmed to carry out the method set forth above.

DETAILED DESCRIPTION

Figure 1:
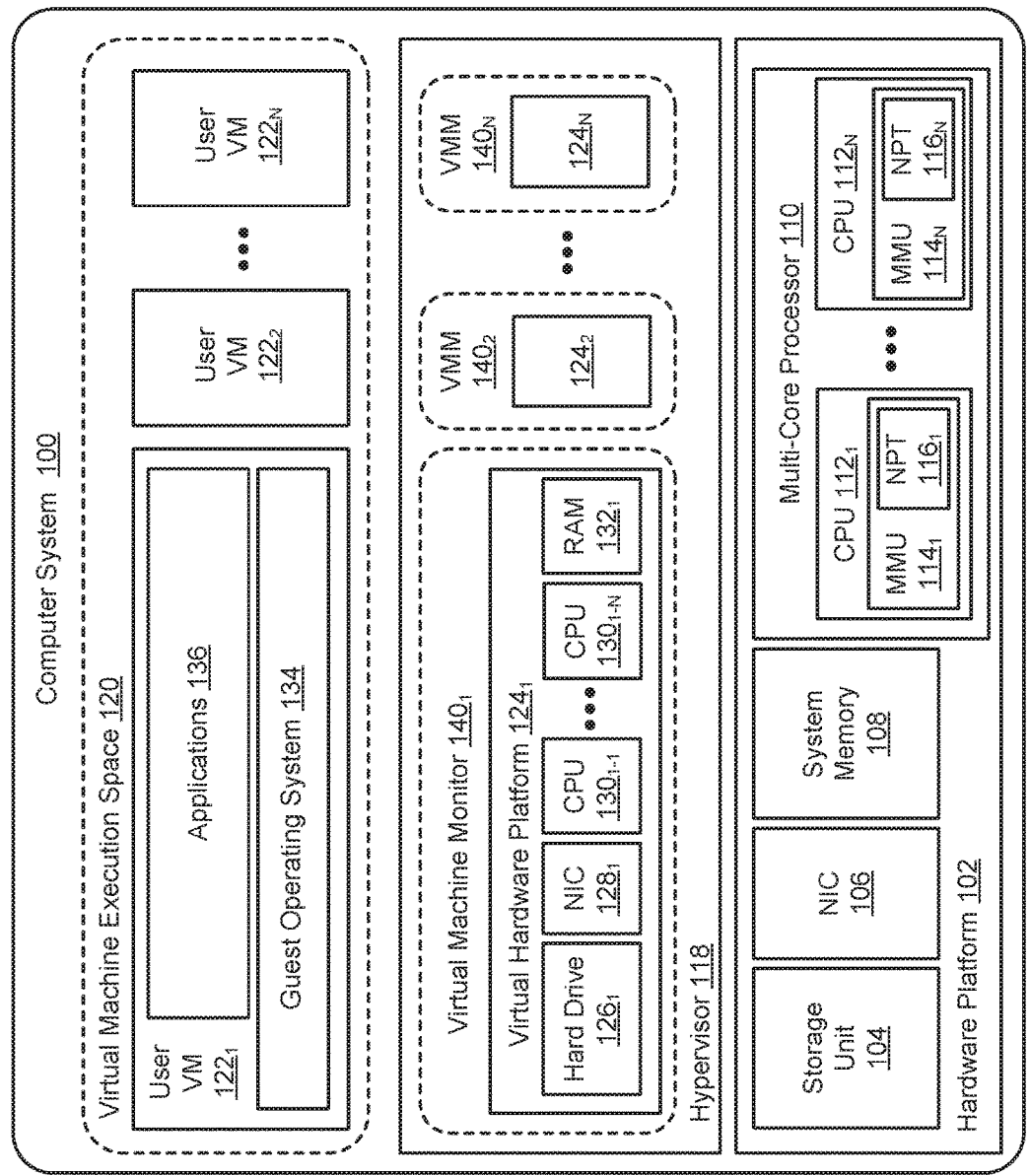
FIG. 1 depicts a block diagram of an SMP-based virtualized computer system.

FIG. 1 depicts a block diagram of an SMP-based virtualized computer system. In one embodiment, both a primary and a backup VM are implemented in separate physical computer systems similar to the SMP-based virtualized system of FIG. 1. Host computer system 100 may be constructed on a desktop, laptop or server grade hardware platform 102 such as an x86 architecture platform. Such a hardware platform may include a local storage unit 104, such as a hard drive, network adapter (NIC 106), system memory 108, symmetric multi-core processor 110 and other I/O devices such as, for example and without limitation, a mouse and keyboard (not shown in FIG. 1). Symmetric multi-core processor 110 provides multiple CPUs $112_1$ to $112_N$ which operate concurrently and can read and write to any portion of system memory 108. Each of CPUs $112_1$ to $112_N$ includes a memory management unit (MMU) $114_N$ with a support module $116_N$ for traversing nested page tables (NPT) that, as further described below, translate received physical addresses of a VM's guest operating system into the actual corresponding physical addresses of system memory 108 (support module $116_N$ also referred to herein as the "hardware NPT walker"). One example of a multi-core processor 110 that supports such nested page table structures is AMD's Opteron™ family of multi-core processors. It should be recognized that nested page tables are also sometimes referred to as extended page tables.

A virtualization software layer, also referred to hereinafter as hypervisor 118, is installed on top of hardware platform 102. Hypervisor 118 supports virtual machine execution space 120 within which multiple VMs may be concurrently instantiated and executed. As shown, virtual execution space 120 includes VMs $122_1$-$122_N$. For each of VMs $122_1$-$122_N$, hypervisor 118 manages a corresponding virtual hardware platform (i.e., virtual hardware platforms $124_1$-$124_N$) that includes emulated hardware such as virtual hard drive $126_1$, virtual NIC $128_1$, multiple virtual CPUs $130_{1-1}$ to $130_{1-N}$ and RAM $132_2$ for VM $122_1$. For example, virtual hardware platform $124_1$ may function as an equivalent of a standard x86 hardware architecture such that any x86 supported operating system, e.g., Microsoft Windows®, Linux®, Solaris® x86, NetWare, FreeBSD, etc., may be installed as guest operating system 134 to execute any supported application in application layer 136 for user VM $122_1$. Guest operating system 134 of VM $122_1$ includes device drivers (e.g., pre-existing device drivers available for guest operating system 134 etc.) that interact with emulated devices in virtual hardware platform $124_1$ as if such emulated devices were actual physical devices. Hypervisor 118 is responsible for transforming requests from device drivers in guest operating system 134 that are received by emulated devices in virtual platform 124$_1$, into corresponding requests to corresponding physical devices in hardware platform 102.

It should be recognized that the various terms, layers and categorizations used to describe the virtualization components in FIG. 1 may be referred to differently without departing from their functionality or the spirit or scope of the invention. For example, virtual hardware platforms 124$_1$-124$_N$ may be considered to be part of virtual machine monitors (VMM) 140$_1$-140$_N$ which implement the virtual system support needed to coordinate operations between hypervisor 118 and their respective VMs. Alternatively, virtual hardware platforms 124$_1$-124$_N$ may also be considered to be separate from VMMs 140$_1$-140$_N$, and VMMs 140$_1$-140$_N$ may be considered to be separate from hypervisor 118. One example of hypervisor 118 that may be used is included as a component of VMware's ESX™ product, which is commercially available from VMware, Inc. of Palo Alto, Calif. It should further be recognized that other virtualized computer system architectures may be used consistent with the teachings herein, such as hosted virtual machine systems, where the hypervisor is designed to run on top of a host operating system, or a shared storage array network (SAN) that is shared among various virtualized computer systems (e.g., clusters) in order to store virtual hard drives such as hard drive 126$_1$.

In addition, the embodiments described above employ a hardware abstraction layer installed on top of hardware platform 102. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines (VMs 122) are used as an example for the virtual computing instances and hypervisor 118 as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Figure 2:
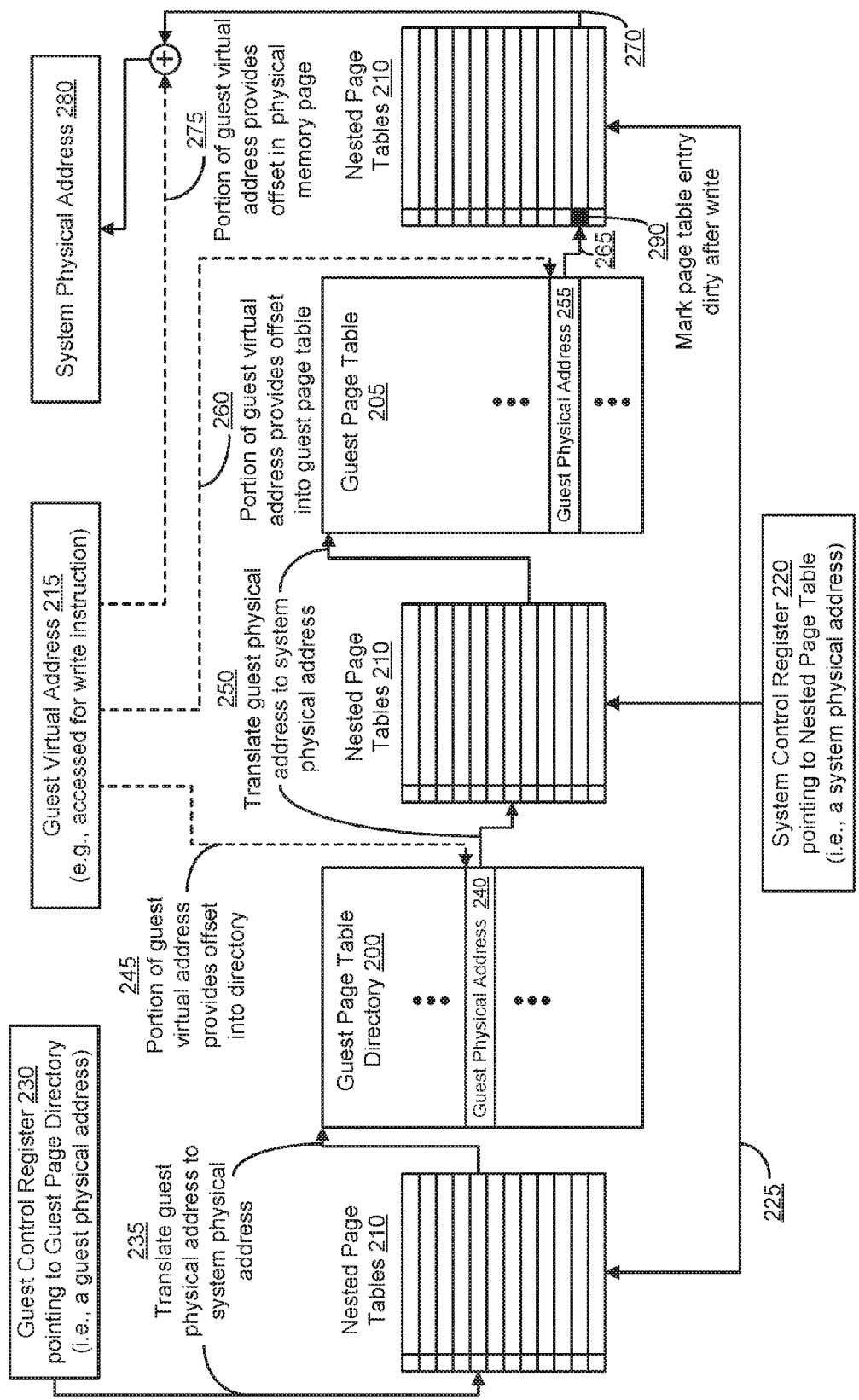
FIG. 2 depicts a logic diagram for memory address translations utilizing a CPU that supports nested page tables.

FIG. 2 depicts a logic diagram for memory address translations utilizing a CPU that supports nested page tables. For example, each of CPUs 112$_1$ to 112$_N$ of multi-core processor 110 includes an MMU 114$_1$-114$_N$, respectively, that implements a hardware NPT walker (e.g., 116$_1$-116$_N$). Guest operating system 134 utilizes and maintains a guest page table structure that stores mappings from guest virtual address to guest physical addresses. For example, the embodiment of FIG. 2 depicts a two level page table structure comprising a guest page directory 200 that includes a list of guest physical addresses referencing one of a plurality of guest page tables, such as guest table 205, that each includes a list of guest physical addresses referencing one of a plurality of memory pages. Simultaneously, hypervisor 118 maintains nested page tables 210 that store page table entries of mappings from guest physical addresses to system physical addresses. Although not depicted in FIG. 2, it should be recognized that nested page tables 210 may also be implemented as multi-leveled page tables similar to the guest page table structures. Hypervisor 118 provides hardware NPT walker 116$_N$ access to both guest page table structure (i.e., guest page directory 200 and guest table 205) and the nested page tables 210 when performing memory address translations from a guest virtual address to a system physical address.

For example, when guest operating system 134 receives an instruction to write data to guest virtual address 215, guest operating system 134 communicates with virtual RAM 132$_1$ in hypervisor 118. Hypervisor 118, in turn, requests hardware NPT walker 116$_N$ to access a system control register 220 that stores a system physical address pointing to nested page tables 210 (sometimes referred to as control register CR3) as shown by arrow 225. Hardware NPT walker 116$_N$ then accesses a guest control register 230 maintained by VM 122$_1$ (e.g., sometimes referred to as guest control register gCR3) that stores a guest physical address pointing to guest page directory 200 and determines the actual system physical address of guest page directory 200 by "walking" nested page tables 210 as shown by arrows 235. Hardware NPT walker 116$_N$ then accesses a first bit portion of guest virtual address 215 to determine an offset within guest page directory 200 that corresponds to an entry for guest physical address 240 that references and corresponds to guest page table 205, as shown by arrow 245. Hardware NPT walker 116$_N$ walks nested page tables 210 again to determine the actual system physical address of guest page table 205, corresponding to guest physical address 240, as shown by arrows 250. Once the system physical address of guest page table 205 has been determined, hardware NPT walker 116$_N$ then accesses a second bit portion of guest virtual address 215 to determine an offset within guest page table 205 that corresponds to a guest physical address 255 that references the page of guest physical memory containing guest virtual address 215, as shown by arrow 260. Hardware NPT walker 116$_N$ walks nested page tables 210 again to determine the system physical address corresponding to guest physical address 255, as shown by arrows 265 and 270. Once the system physical address has been determined, hardware NPT walker 116$_N$ then accesses a third bit portion of guest virtual address 215 to determine an offset, as shown by arrow 275, within the page of system physical memory pointed to by the determined system physical address in order to finally access system physical address 280 corresponding to guest physical address 215. Once the relevant data has been written to system physical address 280 in accordance with the write instruction, the page table entry of nested page table 210 is marked "dirty" (e.g., setting "dirty" bit) indicating that the page has been written to, as shown by marked entry 290.

Figure 3:
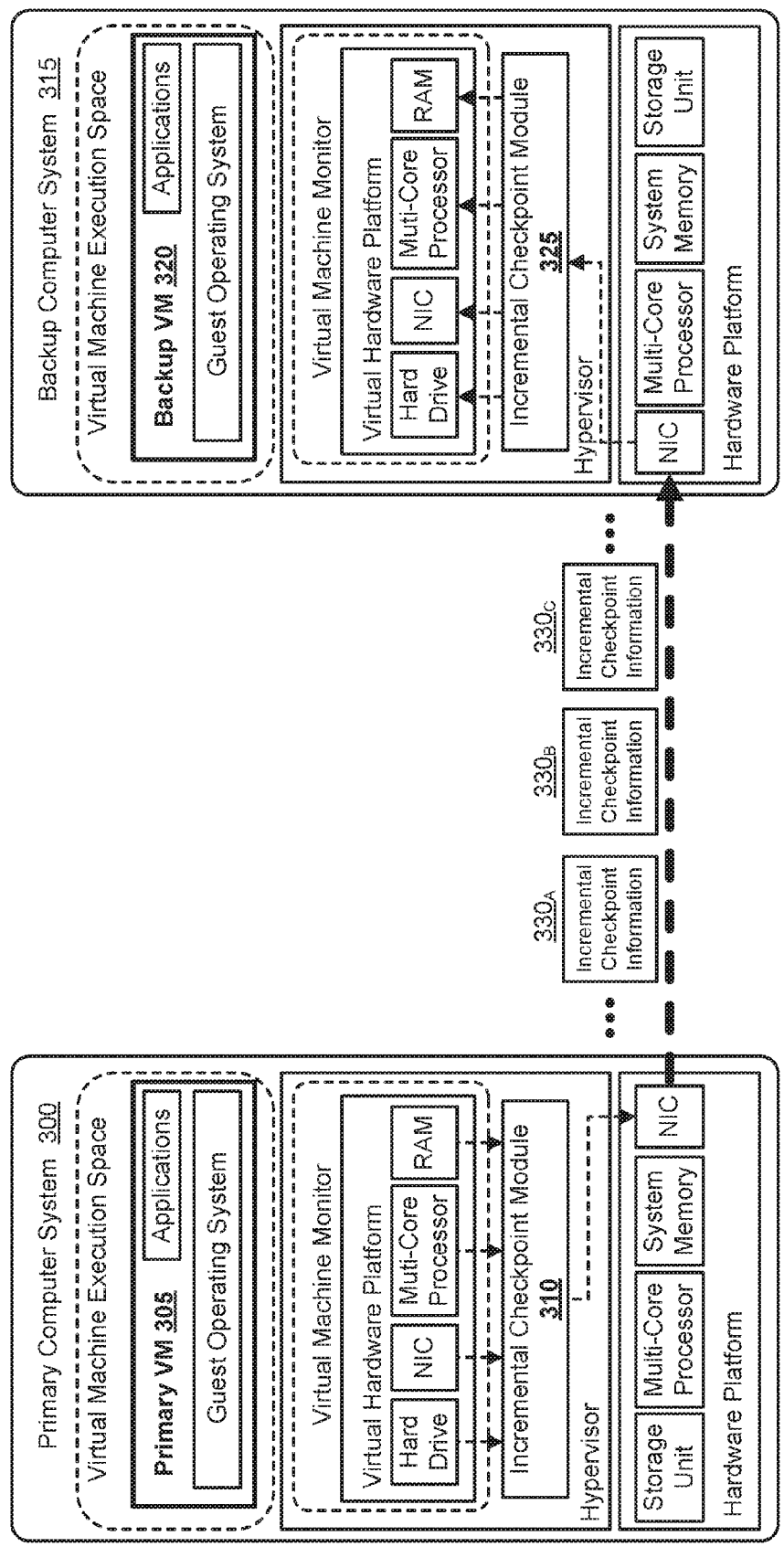
FIG. 3 depicts a block diagram of a primary VM and backup VM engaged in incremental and continuous checkpointing.

FIG. 3 depicts a block diagram of a primary VM and backup VM engaged in incremental and continuous checkpointing. A primary computer system 300 hosts primary VM 305 and includes an incremental checkpointing module 310 in its hypervisor. Incremental checkpointing module 310 continually and frequently transmits incremental checkpoint information packets (see, e.g., $330_A$ to $330_C$) over a network to a backup computer system 315 that hosts backup VM 320. Each checkpoint information packet includes information reflecting changes in the state of primary VM's 305 memory and emulated devices from the prior transmitted incremental checkpoint information packet. On backup computer system 315, incremental checkpointing module 325 of the hypervisor ultimately receives each of the transmitted checkpoint information packets and accordingly updates the state of the memory and emulated devices of backup VM 320 based on the checkpoint information packets. In one embodiment, initiation of the transmission of checkpoint information packets by incremental checkpointing module 310 occurs frequently, for example, once every 10 milliseconds.

Figure 4:
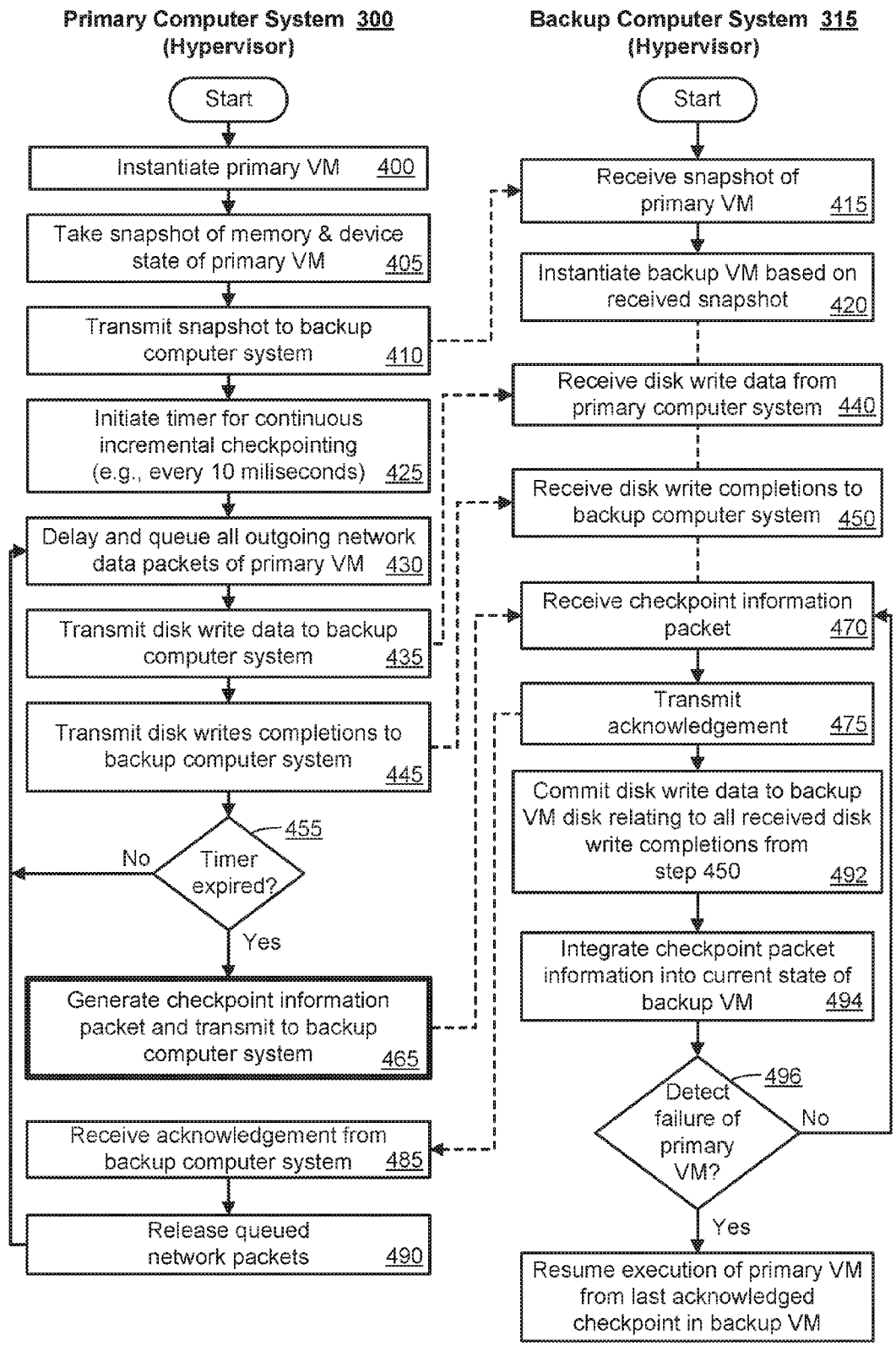
FIG. 4 depicts a flow diagram for transmitting incremental and continuous checkpoint information packets from a primary VM to a backup VM.

FIG. 4 depicts a flow diagram for transmitting incremental and continuous checkpoint information packets from a primary VM to a backup VM. In step 400, the hypervisor of primary computer system 300 instantiates primary VM 305. In step 405, the hypervisor of primary computer system 300 takes an initial snapshot of the state of primary VM 305 (e.g., state of memory and all emulated devices, etc.) and transmits the snapshot to backup computer system 315 in step 410. For example, in an embodiment utilizing VMware's ESX™ virtualization platform, VMware's VMotion technology can be used to create and transmit this initial snapshot. In step 415, backup computer system 315 receives the snapshot and its hypervisor instantiates backup VM 320 based upon the snapshot in step 420. In step 425, the hypervisor (e.g., its incremental checkpoint module 310) of primary VM 300 initiates a timer to frequently trigger the initiation of checkpoints to generate checkpoint information packets (e.g., every 10 milliseconds, etc.).

Steps 430, 435, and 445 are executed prior to the expiration of the time interval that is initially set in step 425 and subsequently set every 10 milliseconds. In step 430, the hypervisor delays and queues any and all outbound network packets generated by primary VM 305. In step 435, the hypervisor transmits any data for disk writes made by primary VM 305 during its execution to backup computer system 315, which receives the data in step 440. Similarly, in step 445, the hypervisor transmits all corresponding disk write completion messages to backup computer system 315, which receives the completion in step 450.

Once the timer expires (e.g., 10 milliseconds has lapsed) in step 455, the hypervisor generates a checkpoint information packet and transmits the checkpoint information packet to backup computer system 315 in step 465. Details of step 465 are shown in FIG. 5.

Figure 5:
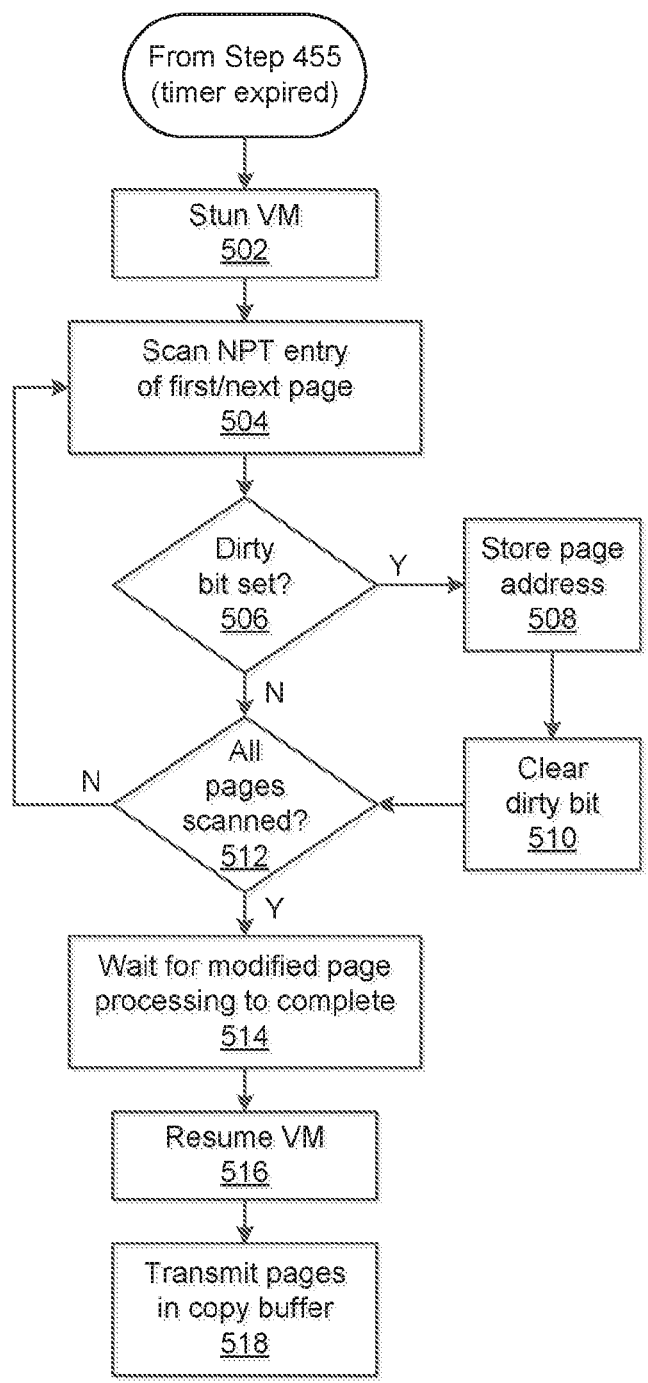
FIG. 5 depicts a flow diagram for "lazy" transmission of memory pages of a primary VM after un-stunning the primary VM.

The hypervisor of primary computer system 300 begins the process shown in FIG. 5 by stunning primary VM 305 (i.e., freezes its execution state) in step 502. Then, the hypervisor, in particular incremental checkpointing module 325, executes steps 504, 506, 508, 510, and 512 to identify memory pages in the virtual memory space of a primary VM that have been modified since the expiration of the last time interval (i.e., since the last checkpoint). To identify modified memory pages, one embodiment leverages the setting of dirty bits in nested page table entries by hardware NPT walker $116_N$ when writing to a system physical page as described in FIG. 2. Assuming that nested page table entries are cleared of all set dirty bits during the start of a new time interval, incremental checkpoint module 310 scans the page table entries in nested page tables 210 in step 504. If, in step 506, incremental checkpoint module 310 encounters a page table entry with a set dirty bit, then in step 508, incremental checkpoint module 310 stores in an address buffer the guest physical address and system physical address corresponding to the page table entry with the set dirty bit. The address buffer is consumed by a separate thread which carries out a method depicted in FIG. 6A or 6B to copy modified memory pages for lazy transmission to backup computer system 315.

Figure 6A:
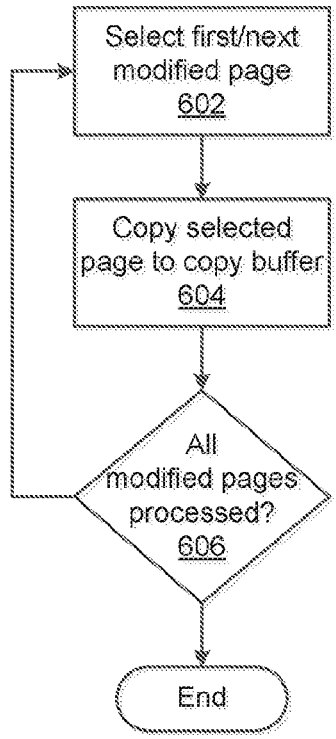
FIG. 6A depicts a flow diagram for copying all modified pages to a copy buffer for lazy transmission.
Figure 6B:
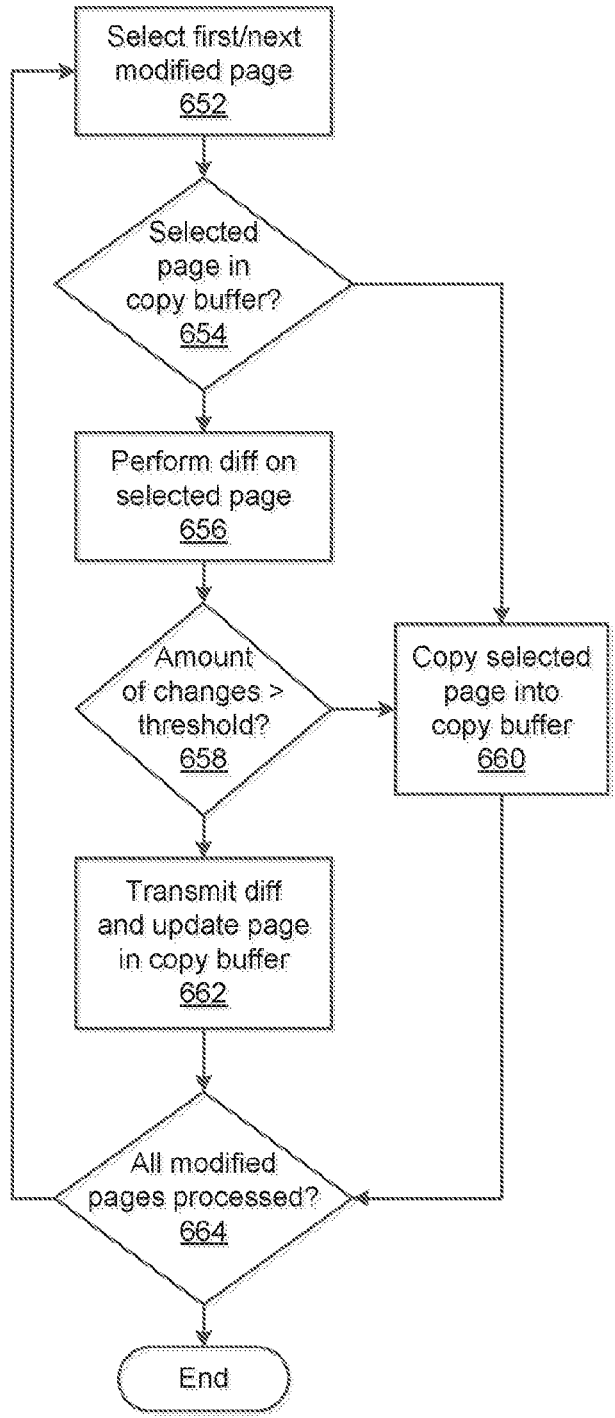
FIG. 6B depicts a flow diagram for generating diffs of some pages for normal transmission while copying the remaining pages in a copy buffer for lazy transmission.

FIGS. 6A and 6B depict alternative methods. In the method of FIG. 6A, modified memory pages are indiscriminately copied to a copy buffer for lazy transmission. In step 602, incremental checkpoint module 310 accesses the address buffer to select the first modified memory page (or the next modified memory page when the process returns to step 602). Then, in step 604, incremental checkpoint module 310 copies the selected page to a copy buffer that is allocated in the system memory of primary computer system 300. According to embodiments, the copy buffer is allocated for each VM that is being checkpointed and sized to hold copies of modified memory pages that have been identified as candidates for lazy transmission. It should be recognized that, if the allocated size of the copy buffer is too small to accommodate copies of all the candidate modified memory pages, incremental checkpoint module 310 performs normal transmission, instead of lazy transmission, for the modified memory pages that cannot be accommodated. Incremental checkpoint module in step 606 checks to see if all addresses in the address buffer have been processed. If so, the process ends. If not, the process returns to step 602.

In the method of FIG. 6B, a diff operation is performed on modified memory pages, such that the memory pages that are copied to the copy buffer for lazy transmission do not include any of the modified memory pages that have been modified by less than a threshold amount. In step 652, incremental checkpoint module 310 accesses the address buffer to select the first modified memory page (or the next modified memory page when the process returns to step 652). Then, in step 654, incremental checkpoint module 310 examines if the selected page has a prior version stored in the copy buffer (or in some embodiments, a separate buffer allocated to store copies of unmodified memory pages so that a diff operation can be carried out on such memory pages after modification). If the selected page does not have a prior version stored in the copy buffer, a diff operation is not possible and so incremental checkpoint module 310 stores the selected page in the copy buffer in step 660 (both for lazy transmission and for diff operation to be carried out thereon during the next checkpoint time interval). On the other hand, if the selected page is in the copy buffer, incremental checkpoint module 310 performs a diff operation in step 656 to determine how much the selected page has been modified by comparing the selected page with the prior version stored in the copy buffer (e.g., byte-by-byte comparison). If the amount of modifications of the selected page is greater than a threshold amount (e.g., 10%) as determined in step 658, incremental checkpoint module 310 stores the selected page in the copy buffer in step 660. On the other hand, if the amount of modifications of the selected page is less than or equal to the threshold amount, incremental checkpoint module 310 transmits the differences to backup computer system 315 (instead of sending the entire page) in step 682. In addition, incremental checkpoint module 310 updates the version of the selected page stored in the copy buffer with the modified version so that a diff operation can be performed against the current version during the next checkpoint interval. Incremental checkpoint module in step 664 checks to see if all addresses in the address buffer have been processed. If so, the process ends. If not, the process returns to step 652.

Returning to FIG. 5, in step 510, incremental checkpoint module 310 clears the set dirty bit for the nested page table entry in preparation for the next checkpoint time interval. In step 512, if scanning of the nested page table entries has not been completed, the flow returns to step 504. As described in the context of FIG. 2, because the dirty bits of nested page table entries are set by hardware NPT walker $116_N$ when a write operation is performed in a memory page, the foregoing steps enable incremental checkpoint module 310 to efficiently identify memory pages that have been modified during the current checkpoint time interval.

It should be recognized that in certain embodiments, nested page tables are hierarchical, with multiple levels of page tables and page directories having entries pointing to different page tables (similar to guest page directory 200 and guest page table 205 in FIG. 2). In one such embodiment, hardware NPT walker $116_N$ also marks a page directory entry with a dirty bit if any memory page in the page directory entry's corresponding page table has been written. An alternative embodiment may mark page directory entries with an "access" bit if any memory page in a page directory entry's corresponding page table has been accessed (e.g., read or written). In either of such embodiments, incremental checkpoint module 310 can utilize hierarchical scanning of the nested page tables to further increase efficiencies, by only descending to the next level if a page directory entry has been marked with a dirty bit or an access bit. This optimization of hierarchical scanning using "access" or "dirty" bits in the page directories is particularly useful for very large memory VMs, since a large part of the memory of a VM may not be accessed or modified in each interval. In yet another alternative embodiment, the scanning of page table entries can be further optimized by subdividing the scanning task to be executed by multiple parallel executing threads. For example, subdivided scanning tasks can be assigned to parallel executing threads in a static round-robin fashion at the lowest page table level. The static assignment ensures that there is little overhead for assigning the tasks to threads, and the low-level interleaved assignment leads to a good load balance where each thread scans both "hot" and "cold" parts of the memory. In yet another embodiment, scanning can be done "eagerly" by an independent thread while the VM is still running (i.e., before a checkpoint starts). Such eager scanning by the independent thread identifies memory pages that have been modified while simultaneously permitting a main executing thread to begin other useful computations on already-identified memory pages, such as "diff" computations on such identified memory pages (as further discussed below).

In step 514, the hypervisor of primary computer system 300 waits for the method depicted in FIG. 6A or 6B to complete. After the method depicted in FIG. 6A or 6B completes, the hypervisor resumes execution of primary VM 305 in step 516 and then, while primary VM 305 is executing, transmits the modified memory pages in the copy buffer to backup computer system 315 in step 518.

Returning to FIG. 4, after the checkpoint information packet (including all of the modified memory pages) have been transmitted to, and received at, backup computer system 315 (step 470), backup computer system 315 transmits an acknowledgement to primary computer system 300 in step 475. Upon receiving the acknowledgement from backup computer system 315 in step 485, primary computer system 300 releases all the queued up network packets (from step 430) in step 490 before returning back to step 430.

Once the hypervisor (e.g., its incremental checkpoint module 325) of backup computer system 315 transmits the acknowledgement in step 475, in step 492, the hypervisor commits to the disk of backup VM 320 all disk write data received in step 440 for which the hypervisor also received a disk write completion signal in step 450. In step 494, the hypervisor of backup computer system 315 then merges or otherwise integrates the updated state reflected in the received checkpoint information packet (from step 470) into the current state of backup VM 320. Subsequently, in step 496, if backup computer system 315 detects that primary computer system 300 has failed, then in step 498, backup computer system 315 resumes execution of primary VM 305 as backup VM 320 from the last received (and acknowledged) checkpoint information packet. It should be recognized that delaying and queuing the outbound network packets in step 430 and releasing them only after an acknowledged checkpoint transaction in step 490 ensures that restoration of primary VM 305 by backup computer system 315 upon a failure of primary computer system 300 is based on a state of primary VM 305 that can properly resume network communications with external entities (i.e., re-transmit outbound network packets since the recovered state without confusing recipients, re-receive inbound network packets that it is expecting, etc.).

It should be recognized that various modifications and changes may be made to the specific embodiments described herein without departing from the broader spirit and scope of the invention as set forth in the appended claims. For example, while the foregoing discussions have focused on incremental and continuous checkpointing for fault tolerance, it should be recognized that such techniques may also be used to enable users to revert back in an application to almost any previous point in time, to perform reverse debugging, and to speed up applications by allowing speculative calculations that can be reverted if necessary. Similarly, while the foregoing embodiments have been generally described using a backup VM, any collector process and any backup computer system may be used consistent with the teachings herein. Use of the term "backup computer system" should not be construed as necessarily providing any other types of "backup" functions, other than the functions supporting continuous checkpointing as described herein. For example, a backup computer system may support collector processes other than backup virtual VMs for fault tolerance purposes such as for use in reverting back to particular points of applications, reverse debugging, and speeding up applications.

In addition, while the foregoing discussions have focused on incremental and continuous checkpointing of virtual machines as an example of a virtual computing instance, such techniques may also be used for checkpointing of OS-less containers, which includes the steps of freezing the container, and checkpointing the address space and state of the entire process tree of the container to a collection of image files. Resuming the container from a checkpoint includes the steps of restoring the process tree from the collection of image files and the address space, and resuming the container from the point at which it was frozen.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of transmitting from a first host computer to a second host computer, modifications made to memory pages of a virtual computing instance running in the first host computer during a time interval, the method comprising:
   stunning the virtual computing instance at the end of the time interval;
   while the virtual computing instance is stunned, detecting at the first host computer the memory pages that have been modified during the time interval, and copying one or more of the modified memory pages to a memory region in the first host computer, wherein the modified memory pages include first memory pages and second memory pages and the first memory pages are the one or more memory pages copied to the memory region;
   resuming the virtual computing instance; and
   after said resuming, transmitting the first memory pages from the memory region in the first host computer to the second host computer while the virtual computing instance is running in the first host computer and transmitting modifications of the second memory pages from the memory region in the first host computer to the second host computer while the virtual computing instance is running in the first host computer, wherein the first memory pages are modified memory pages in each of which an amount of modifications is determined to exceed a threshold amount and modified memory pages not having a previous version thereof stored in the memory region, and the second memory pages are modified memory pages in each of which an amount of modifications is determined to not exceed the threshold amount.

2. The method of claim 1, further comprising:
   performing a diff analysis on each of the modified memory pages having a previous version of the memory page stored in the memory region to determine the amount of modifications of the memory page.

3. The method of claim 1, further comprising:
   commencing a next time interval upon said resuming and before any of the copied memory pages are transmitted to the second host computer,
   wherein the time interval and the next time interval are checkpoint time intervals.

4. The method of claim 3, wherein the memory region into which the modified memory pages are copied, is allocated to the virtual computing instance, and the same memory region is used during subsequent checkpoint time intervals as a copy destination of one or more memory pages that are modified during the subsequent checkpoint time intervals.

5. The method of claim 1, wherein said detecting includes:
   scanning nested page table entries corresponding to memory pages of the virtual computing instance,
   wherein each memory page having a nested page table entry with a dirty bit that is set, is detected as a modified memory page.

6. The method of claim 1, wherein said virtual computing instance is a virtual machine.

7. The method of claim 1, wherein said virtual computing instance is a container.

8. A non-transitory computer readable medium comprising instructions to be executed in a first host computer to cause the first host computer to carry out a method of transmitting to a second host computer, modifications made to memory pages of a virtual computing instance running in the first host computer during a time interval, wherein the method comprises:

stunning the virtual computing instance at the end of the time interval;

while the virtual computing instance is stunned, detecting at the first host computer the memory pages that have been modified during the time interval, and copying one or more of the modified memory pages to a memory region in the first host computer, wherein the modified memory pages include first memory pages and second memory pages and the first memory pages are the one or more memory pages copied to the memory region;

resuming the virtual computing instance; and after said resuming, transmitting the first memory pages from the memory region in the first host computer to the second host computer while the virtual computing instance is running in the first host computer and transmitting modifications of the second memory pages from the memory region in the first host computer to the second host computer while the virtual computing instance is running in the first host computer, wherein the first memory pages are modified memory pages in each of which an amount of modifications is determined to exceed a threshold amount and modified memory pages not having a previous version thereof stored in the memory region, and the second memory pages are modified memory pages in each of which an amount of modifications is determined to not exceed the threshold amount.

9. The non-transitory computer readable medium of claim 8, wherein the method further comprises:

performing a diff analysis on each of the modified memory pages having a previous version of the memory page stored in the memory region to determine the amount of modifications of the memory page.

10. The non-transitory computer readable medium of claim 8, wherein the method further comprises:

commencing a next time interval upon said resuming and before any of the copied memory pages are transmitted to the second host computer, wherein the time interval and the next time interval are checkpoint time intervals.

11. The non-transitory computer readable medium of claim 10, wherein the memory region into which the modified memory pages are copied, is allocated to the virtual computing instance, and the same memory region is used during subsequent checkpoint time intervals as a copy destination of one or more memory pages that are modified during the subsequent checkpoint time intervals.

12. The non-transitory computer readable medium of claim 8, wherein said detecting includes:

scanning nested page table entries corresponding to memory pages of the virtual computing instance, wherein each memory page having a nested page table entry with a dirty bit that is set, is detected as a modified memory page.

13. The non-transitory computer readable medium of claim 8, wherein said virtual computing instance is a virtual machine.

14. The non-transitory computer readable medium of claim 8, wherein said virtual computing instance is a container.

15. A computer system configured to transmit modifications made to memory pages of a virtual computing instance running therein to a backup computer system, the computer system comprising:

a system memory comprising a hypervisor component configured to instantiate the virtual computing instance; and a processing unit configured to execute the hypervisor component to transmit modifications made to the memory pages of the virtual computing instance during a time interval by performing the steps of:

stunning the virtual computing instance at the end of the time interval;

while the virtual computing instance is stunned, detecting the memory pages that have been modified during the time interval, and copying one or more of the modified memory pages to a memory region in the system memory, wherein the modified memory pages include first memory pages and second memory pages and the first memory pages are the one or more memory pages copied to the memory region;

resuming the virtual computing instance; and after said resuming, transmitting the first memory pages from the memory region in the system memory to the backup computer system while the virtual computing instance is running and transmitting modifications of the second memory pages from the memory region in the system memory to the backup computer while the virtual computing instance is running, wherein the first memory pages are modified memory pages in each of which an amount of modifications is determined to exceed a threshold amount and modified memory pages not having a previous version thereof stored in the memory region, and the second memory pages are modified memory pages in each of which an amount of modifications is determined to not exceed the threshold amount.

16. The computer system of claim 15, wherein the steps further include:

performing a diff analysis on each of the modified memory pages having a previous version of the memory page stored in the memory region to determine the amount of modifications of the memory page.

17. The computer system of claim 15, wherein the hypervisor commences a next time interval upon said resuming and before any of the copied memory pages are transmitted to the second host computer, and the time interval and the next time interval are checkpoint time intervals.

18. The computer system of claim 17, wherein the memory region into which the modified memory pages are copied, is allocated to the virtual computing instance, and the same memory region is used during subsequent checkpoint time intervals as a copy destination of one or more memory pages that are modified during the subsequent checkpoint time intervals.

19. The computer system of claim 15, wherein said virtual computing instance is a virtual machine.

20. The computer system of claim 15, wherein said virtual computing instance is a container.

* * * * *